No. 812,254. PATENTED FEB. 13, 1906.
L. W. BENSON.
TIRE TIGHTENER.
APPLICATION FILED JAN. 7, 1905.
2 SHEETS—SHEET 1.
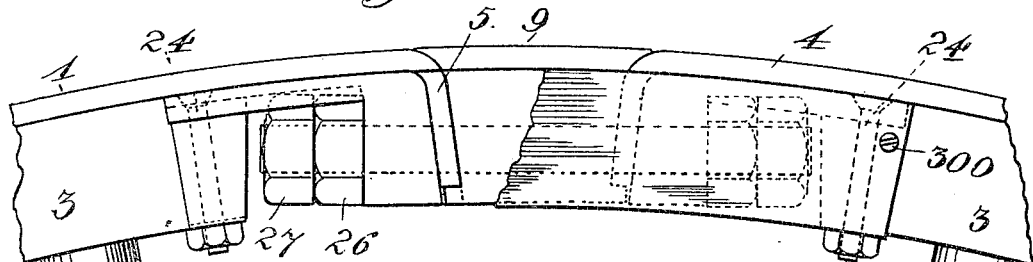
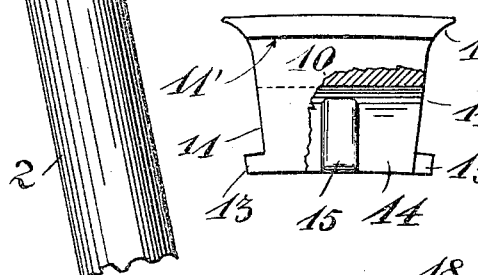 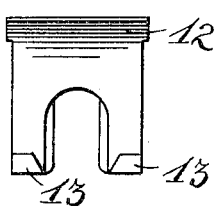
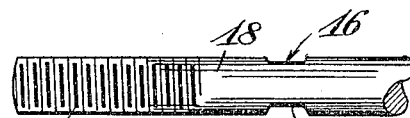
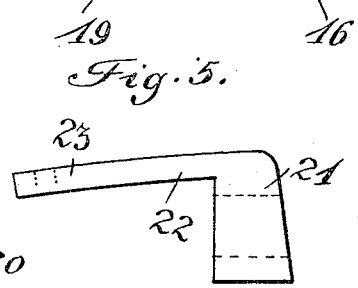 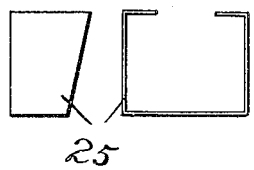
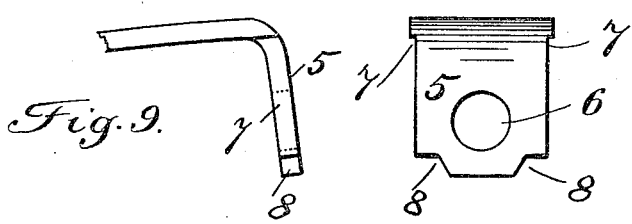
WITNESSES:
C. Munter
C. H. Griesbauer
INVENTOR
Lewis Wetzel Benson
By H. B. Willson
Attorney No. 812,254. PATENTED FEB. 13, 1906.
L. W. BENSON.
TIRE TIGHTENER.
APPLICATION FILED JAN. 7, 1905.

2 SHEETS—SHEET 2.

WITNESSES:
C. Munter
C. H. Griesbauer.

INVENTOR
Lewis Wetzel Benson
By H. B. Willeson
Attorney

UNITED STATES PATENT OFFICE.

LEWIS WETZEL BENSON, OF WICHITA, KANSAS.

TIRE-TIGHTENER.

No. 812,254.  Specification of Letters Patent.  Patented Feb. 13, 1906.

Application filed January 7, 1905. Serial No. 240,074.

*To all whom it may concern:*

Be it known that I, LEWIS WETZEL BENSON, a citizen of the United States, residing at Wichita, in the county of Sedgwick and State of Kansas, have invented certain new and useful Improvements in Tire-Tighteners; and I do declare the following to be a full, clear, and exact description of the invention, such as will enable others skilled in the art to which it appertains to make and use the same.

My invention relates to improvements in tire-fastening devices by means of which a tire may be readily tightened or loosened without removing the same from the wheel or the wheel from the vehicle.

The object of my invention is to provide a simple, durable, comparatively inexpensive, and highly-efficient device of this character which may be readily applied to either old or new wheels and which will materially strengthen the same at the point of application instead of weakening the wheel, as is usual in devices of this nature.

With the above and other objects in view the invention consists of certain novel features of construction, combination, and arrangement of parts, as will be hereinafter described and claimed.

Figure 13:
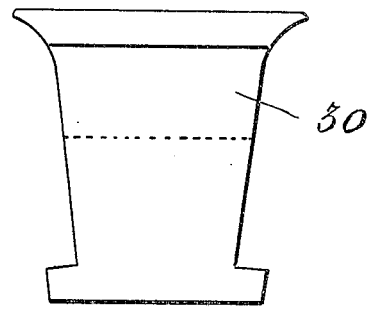
Figure 14:
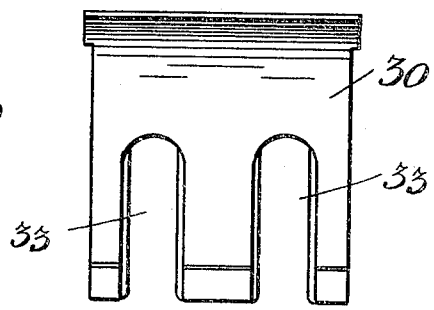
Figure 15:
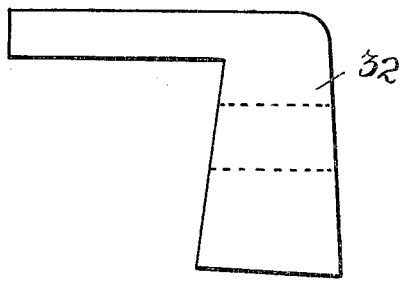
Figure 16:
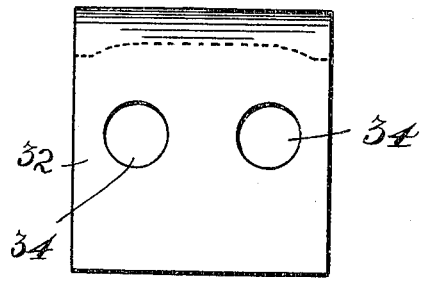
Figure 11:
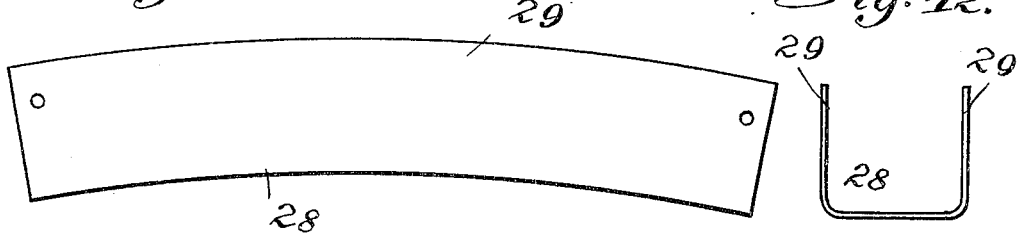
Figure 12:
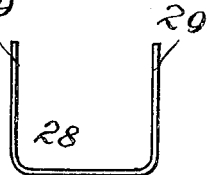

In the accompanying drawings, Figure 1 is a side elevation, with parts broken away, of a portion of a wheel, showing the application of my invention thereto. Fig. 2 is a side elevation, partly in section, of the bridge block or key, which is inserted between the ends of the tire. Fig. 3 is an end elevation of the same. Fig. 4 is a detail view of one end of the tightening-screw. Figs. 5 and 6 are respectively side and end views of one of the tire-supporting blocks, which are secured to and form an extension of the ends of the wheel rim or felly. Figs. 7 and 8 are respectively side and end views of one of the clips for protecting one of the ends of the wheel rim or felly. Figs. 9 and 10 are respectively side and end views of one of the downturned apertured ends of the tire. Figs. 11 and 12 are respectively side and end views of the covering or casing for the device. Figs. 13 and 14 are respectively side and end views of a bridge block or key for use upon heavy wheels where more than one tightening screw or bolt is necessary, and Figs. 15 and 16 are respectively side and end views of tire-supporting blocks used in connection with the bridge block or keys shown in Figs. 13 and 14.

Referring to the drawings by numeral, 1 denotes a portion of a vehicle-wheel comprising spokes 2, the rim or felly 3, and a metallic tire 4. The rim or felly 3 is cut away between two of the spokes, and the ends of the tire 4 are downturned, as shown at 5, and formed with central openings 6, recessed portions 7 at each of their sides, and recessed portions 8 at the corners of their extreme inner ends. The meeting ends of the tire and the rim or felly are thus formed to adapt them to receive my improved fastening and tightening device 9, which, it will be seen, may be applied to either new or old wheels.

The fastening device 9 comprises a spacing block or key 10, which is adapted to fit in between the downturned ends 5 of the tire in order to fill the space between them and complete the curvature of the wheel. This block 10 is substantially wedge-shaped, its two inclined end faces 11 being formed at their outer ends with outwardly-curved portions 12 to engage the bend of the tire and at their inner ends with projecting studs 13, which are adapted to project into the recessed portion 8 upon the ends 5 of the tire. The side faces of the said block 10 are also recessed, as shown at 11', for a purpose hereinafter explained. Extending longitudinally through the block 10 is a slot 14, which has at the center of each of its side walls an inwardly-projecting rib or stud 15. These ribs 15 are adapted to engage recessed portions 16, formed at opposite points in the center of a screw or bolt 18, which extends through the said slot 14 and through the openings 6 in the ends 5 of the tire. This screw or bolt 18 has each of its ends screw-threaded, as shown at 19, and said ends extend through openings 20, formed in one of the ends 21 of substantially L-shaped blocks 22, which are adapted to engage the inner faces of the ends of the tire to support the same and strengthen the wheel at this point. The other ends or arms 23 of said L-shaped supporting-blocks 22 are secured to the ends of the rim or felly 3 by means of bolts 24, which are passed through alining openings formed in the said ends 23, the felly 3, and a substantially U-shaped clip 25, which is provided upon the ends of the rim or felly 3 for the purpose of protecting the same. Upon each of the screw-threaded ends 19 of the screw or bolt 18 are an adjusting-nut 26 and a locking or jam nut 27, so that the parts of the device may be readily adjusted to tighten or loosen the tire. In order to protect the parts of the tightening device and at the same time strengthen the wheel, I provide a casing or covering 28, which is substantially U-shaped in cross-section and is adapted to engage the inner face and the side faces of the felly or rim 3, the sides 29 of said casing being seated in the recessed portions 7 and 11' of the tire ends 5 and the bridge-block 10 and being secured to the felly or rim 3 by one or more screws 300.

When the fastening device is used upon very heavy wheels, I provide more than one of the tightening screws or bolts 18 and arrange them side by side. In Figs. 13 to 16, inclusive, of the drawings I have shown a bridge block or key 30, which corresponds to the block 10, and a spacing-block 32, which corresponds to the block 22, adapted for use when two tightening screws or bolts are used. It will be seen that these blocks are formed with alined openings 33 and 34, which correspond to the openings 14 and 20, respectively, in the blocks 10 and 22.

The construction, operation, and advantages of my invention will be readily understood from the foregoing description, taken in connection with the accompanying drawings. It will be seen that an old wheel upon which the tire is loose may be readily equipped with my invention. It will also be noted that by securing the supporting-block 22 to the rim or felly 3 and constructing the bridge block or key 10 as shown and described the strain or pull is thrown close to the edge of the wheel, and the wheel is materially strengthened at this point. It will be understood that the bridge-block employed must be of the required length to allow of the tightening of the tire and to fit in the space between the ends of the tire after the latter has been tightened. In practice a number of such blocks of varying lengths are provided, one of appropriate length being used whenever the tire is tightened.

While I have shown and described the preferred embodiment of my invention, it will be understood that I do not wish to be limited to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

The combination with the abutting ends of a wheel rim or felly and a tire having downturned apertured ends, of an apertured bridge block or key inserted between said downturned ends, L-shaped supporting blocks engaging the inner faces of said downturned ends, clips upon the ends of said rim or felly, a double screw passed through said blocks and the ends of said tire and having its center secured against rotation in said bridge-block, nuts upon the ends of said screw, a casing covering the inner and side faces of the ends of said rim or felly, and bolts or similar fastening means passed through the supporting-blocks, the felly, the clips and said casing, substantially as described.

In testimony whereof I have hereunto set my hand in presence of two subscribing witnesses.

LEWIS WETZEL BENSON.

Witnesses:
E. E. HARVEY,
HOMER WELLS.